April 8, 1924.
B. F. GARDNER ET AL
1,489,492
LAWN MOWER SHARPENING TOOL
Filed July 21, 1922
2 Sheets-Sheet 1
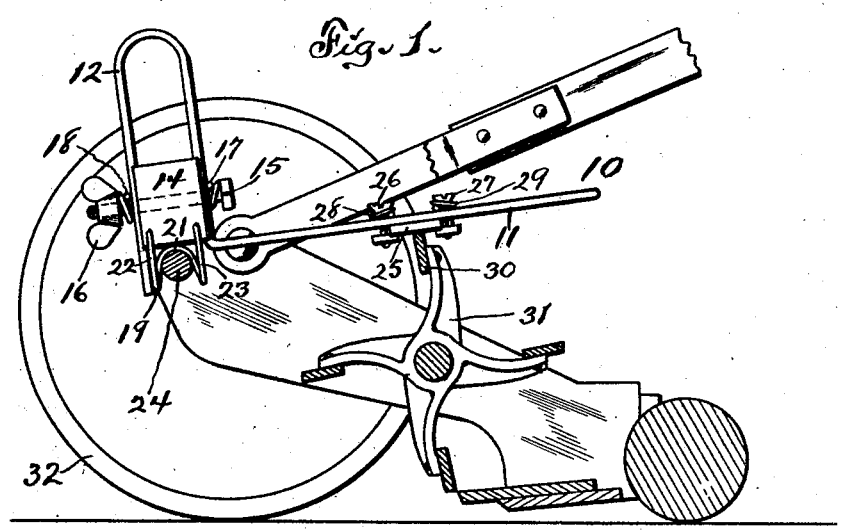
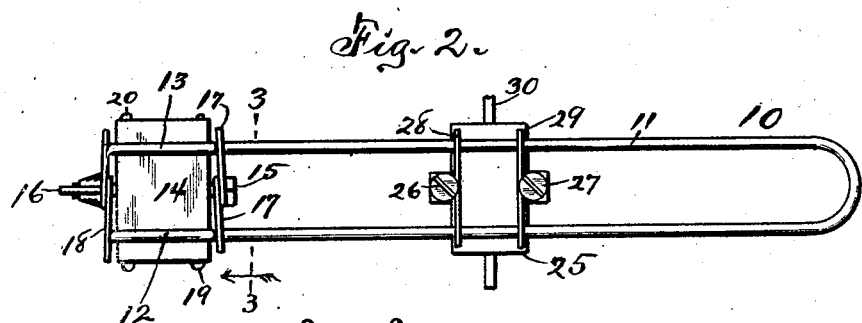
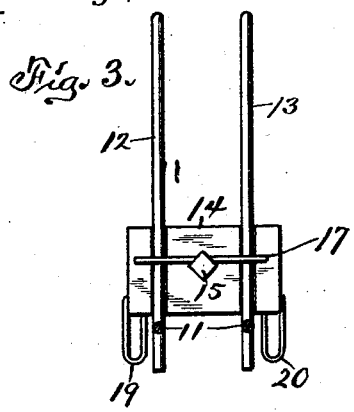
Inventors:
B. F. Gardner and
H. G. Gardner
By Silas L. Sweet Atty

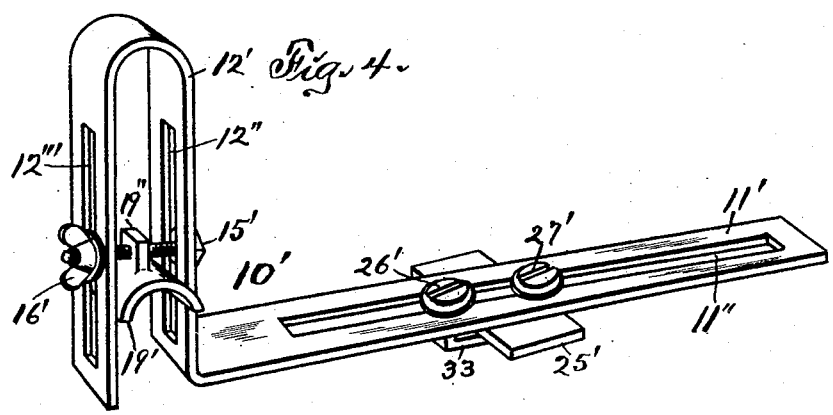
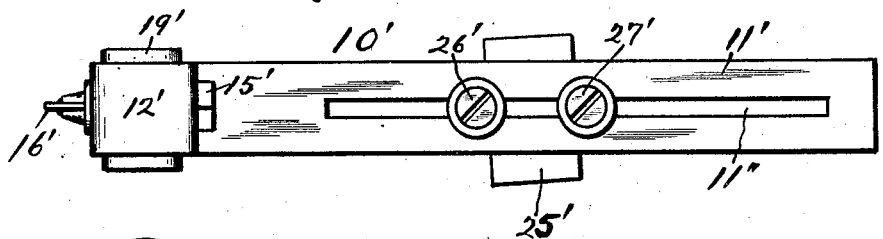
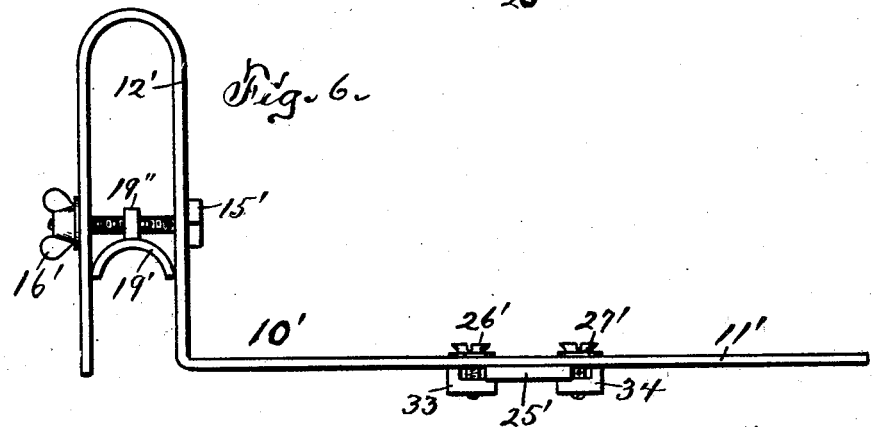

Patented Apr. 8, 1924.

1,489,492

UNITED STATES PATENT OFFICE.

BENJAMIN F'RK GARDNER AND DEWEY G. GARDNER, OF WALL LAKE, IOWA.

LAWN-MOWER-SHARPENING TOOL.

Application filed July 21, 1922. Serial No. 576,466.

*To all whom it may concern:*

Be it known that we, BENJAMIN F. GARDNER and DEWEY G. GARDNER, citizens of the United States of America, and residents of Wall Lake, Sac County, Iowa, have invented a new and useful Lawn-Mower-Sharpening Tool, of which the following is a specification.

An object of this invention is to provide an improved construction for a hand tool adapted to be employed for sharpening the cutting blades of lawn mower reels.

A further object of this invention is to provide means for supporting and guiding a tool in reciprocation longitudinally of a cutter blade.

A further object of this invention is to provide means for adjusting a tool angularly relative to a cutter blade thereby determining the angle of a bevel formed by the tool on said blade.

Our invention consists in the construction, arrangement and combination of elements hereinafter set forth, pointed out in our claims and illustrated by the accompanying drawing, in which—

Figure 1 is an elevation, partly in section, showing our improved tool mounted on a lawn mower in position for practical use. Figure 2 is a plan of the tool shown in elevation in Figure 1. Figure 3 is a cross-section on the indicated line 3—3 of Figure 2.

Figures 4, 5 and 6 are perspective, plan and side elevation respectively of a modified form of tool.

In the construction of the device as shown in Figures 1, 2 and 3 the numeral 10 designates generally a frame preferably formed of a single piece of round wire recurved on its central portion to form a U-shaped handle member 11 having relatively long arms arranged parallel with each other. Each arm of the frame is bent upwardly substantially midway of its length and each portion so bent upwardly is recurved on its central portion and has its terminal arm extended across the plane of the handle member, whereby twin arches 12, 13 are produced, each arch being of substantially inverted U-shape and said arches being parallel. A head 14 is mounted within and extends transversely of both arches 12, 13 and a bolt 15 extends transversely of said head between said arches and is provided with a wing-nut 16 on one end. Clamp members 17, 18 are mounted on the end portions of the bolt 15 and extend across extreme outer faces of the arches 12, 13. Each clamp member preferably is formed of a single length of round wire looped about the bolt 15 and having its end portions extended longitudinally of and parallel with the vertical sides of the head 14, said end portions extending across the arms of the arches opposite to the adjacent faces of said head. Thus provision is made for removing and replacing the head 14 conveniently relative to the arches by loosening the clamping effect of the bolt 15 and turning the clamping member 17 into a position at right angles to that shown whereby it may pass off and between the arches in any vertical movement of the head relative to the arches. The head 14 preferably is made of wood and guide yokes 19, 20 are mounted thereon and project therefrom within or adjacent to the bases of the arches 12, 13. Each guide yoke preferably is formed of a single length of round wire recurved on its central portion to form a guide seat 21 and recurved in the opposite direction at the extremities of the arms of the guide seat to form legs 22, 23; the end portions of the legs being bent at right angles to the bodies thereof and driven into end portions of the head 14. Thus provision is made for slidingly resting and mounting one end portion of the tool on a connecting rod 24 of a lawn mower, said lawn mower being illustrated in part and conventionally in Figure 1, the tool being adapted for manual sliding movement on said rod and longitudinally thereof. An abrading implement 25, which may be formed of a short section of a flat file of well known character, is mounted transversely of and beneath the central portion of the frame and is secured thereto as follows: Stove bolts 26, 27 are mounted loosely through the opening in the frame handle 11 transversely of the abrading element 25 and on opposite sides thereof and the nuts of said bolts overlapping slightly upon and engaging said abrading element. Clamping members 28, 29 are mounted on the stove bolts 26, 27 and extend across and engage the upper surface of the handle 11. Tightening of the stove bolts 26, 27 results in a clamping effect on the abrading element whereby it is held tightly to the handle. The clamping members 28, 29 are substantial duplicates of the members 17, 18 and engage the stove bolts by their looped centers and the arms of the handle 11 by their laterally extended end portions. By the use of the clamping devices as shown the abrading element 25 may be adjusted longitudinally of the handle member 11 properly to bridge the space between the rod 24 and the cutter blade 30 on a lawn mower reel 31. By the same means the abrading element 25 may be adjusted angularly relative to the handle member 11 to accommodate it to a helical formation of cutter blade commonly found in lawn mowers.

In practical use the lawn mower is supported or suspended in such manner that its traction wheels, one of which is shown in Figure 1 and indicated by the numeral 32, are free to rotate in either direction, thereby releasing the reel 31 and cutter blades thereon from control because of the gearing commonly found between the reel and traction wheels. Thereupon the sharpening tool is mounted as illustrated in Figure 1 loosely on the rod 24 and in contact with the beveled margin of a cutter blade 30 and is manually operated to and fro longitudinally of the rod and blade. The nuts of the stove bolts 26, 27 serve as guides to confine the marginal portion of the cutter blade and effect an oscillation of the reel so that although the abrading element 25 is moved in a right line the beveled face of the blade may be abraded, ground or reduced uniformly to produce a cutting edge at the acute angle thereof. The several blades on the reel may be treated in turn by rotary adjustment of the reel to bring them successively within the range of operation of the tool.

In the construction of the tool as illustrated in Figures 4, 5 and 6 a frame 10′ is formed of a single piece of bar metal having a handle member 11′ compassing substantially one-half the length of the bar and formed with a longitudinal slot 11″. The remainder of the bar is bent upwardly and recurved at its central portion to form an arch 12′ and each arm of the arch is formed with a longitudinal slot 12″ or 12‴. A guide member 19′, preferably made of arched metal, is arranged within and transversely of the arch 12′ and is formed with an ear 19″ rising from its convex surface and apertured in registry with the slots 12″, 12‴. A bolt 15′ is mounted loosely through the slots 12″, 12‴ and the hole in the ear 19″ and a wing-nut 16′ is mounted on the forward end of said bolt and may be employed to clamp the arms of the arch rigidly to the guide member 19′. Thus provision is made for adjusting the guide member 19′ in and locking it to the arch 12′. An abrading element 25′ is mounted transversely of and beneath the handle 11′ and stove bolts 26′, 27′ are mounted through the groove 11″ on opposite sides of the element. Flanged nuts 33, 34 are employed on the stove bolts 26′, 27′ and overlap and engage beneath the abrading element 25′ whereby said element may be clamped in any desired position on the handle 11′, the flanges of said nuts engaging the lower face of and serving to level the nuts with the abrading element.

The device illustrated in Figures 4, 5 and 6 is usable and adjustable substantially in the same manner as the device above described in connection with Figures 1, 2 and 3 and is to be considered a modification thereof.

We claim as our invention—

1. A lawn-mower sharpening tool, comprising a suitable frame formed with an integral arch at one end, a guide head mounted adjustably in said arch and adapted for sliding engagement with a suitable support, and an abrading element mounted on said frame and spaced from said head and adapted for engagement with an object to be abraded.

2. A lawn-mower sharpening tool, comprising a slotted frame formed with an integral arch at one end perpendicular to the body of the frame, a guide head mounted adjustably in said arch and adapted for sliding engagement with a suitable support, and an abrading element mounted on said frame and spaced from said head and adapted for engagement with an object to be abraded, said abrading element extending across and being adjustable longitudinally of the slot in said frame.

3. A lawn-mower sharpening tool, comprising a suitable frame having a longitudinal slot in its body and formed with an integral arch at one end, the walls of said arch being formed with registering slots, a guide head mounted in said arch and adapted for sliding engagement with a suitable support, a clamping bolt extending through the slots of the arch and also extending through said guide-head, and an abrading element mounted on said frame and spaced from said head and adapted for engagement with an object to be abraded, said abrading element being adjustable longitudinally and angularly of said frame.

4. A lawn-mower sharpening tool, comprising a suitable frame formed with an arch at one end, a concaved guide head mounted between the walls of said arch and adapted for sliding engagement with a suitable support, and an abrading element mounted on said frame and spaced from said head and adapted for engagement with an object to be abraded, said guide head being adjustable laterally of said frame wholly within and guided by said arch.

Signed at Wall Lake, in the county of Sac and State of Iowa, this 21st day of April, 1922.

BENJAMIN F'RK GARDNER.
DEWEY G. GARDNER.